(12) United States Patent
    Chiku

(10) Patent No.: US 7,784,105 B2
(45) Date of Patent: Aug. 24, 2010

(54) DEVICE AUTHENTICATION SYSTEM

(75) Inventor: Mamoru Chiku, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1049 days.

(21) Appl. No.: 11/501,832

(22) Filed: Aug. 10, 2006

(65) Prior Publication Data

US 2007/0050627 A1      Mar. 1, 2007

(30) Foreign Application Priority Data

Aug. 30, 2005    (JP) .............................. 2005-249692

(51) Int. Cl.
    *G06F 21/00*    (2006.01)
(52) U.S. Cl. .............................. 726/34; 380/2; 713/168
(58) Field of Classification Search .................. 726/34; 380/2
    See application file for complete search history.

(56) References Cited

U.S. PATENT DOCUMENTS

2005/0188206 A1* 8/2005 Kwok ......................... 713/176

FOREIGN PATENT DOCUMENTS

JP    11-008618    1/1999

* cited by examiner

*Primary Examiner*—Ponnoreay Pich
(74) *Attorney, Agent, or Firm*—Louis Woo

(57) ABSTRACT

An authenticating device generates authentication base data and verification data. The authenticating device embeds the verification data in the authentication base data to generate authentication data. The authenticating device transmits the authentication data to a device to be authenticated. In the device to be authenticated, the verification data is extracted from the transmitted authentication data, and verification reply data is generated on the basis of the extracted verification data. The device to be authenticated generates reply base data, and embeds the verification reply data in the reply base data to generate authentication reply data. The device to be authenticated transmits the authentication reply data to the authenticating device. The authenticating device extracts the verification reply data from the transmitted authentication reply data. The authenticating device compares the original verification data and the extracted verification reply data to decide whether or not the device to be authenticated is genuine.

5 Claims, 11 Drawing Sheets

FIG. 2

|    | X0 | X1 | X2 | X3 | X4 | X5 | X6 | X7 |
|----|----|----|----|----|----|----|----|----|
| Y1 | 0  | 1  | 0  | 1  | 0  | 0  | 1  | 1  |
| Y2 | 1  | 1  | 0  | 0  | 0  | 1  | 0  | 1  |
| Y3 | 0  | 0  | 1  | 0  | 1  | 0  | 1  | 0  |
| Y4 | 1  | 1  | 0  | 1  | 0  | 0  | 0  | 1  |

FIG. 3

|    | X0 | X1 | X2 | X3 | X4 | X5 | X6 | X7 |
|----|----|----|----|----|----|----|----|----|
| Y1 | 0  | 1  | 1  | 0  | 1  | 0  | 1  | 1  |
| Y2 | 1  | 1  | 1  | 0  | 0  | 0  | 0  | 1  |

FIG. 4

|    | X0 | X1 | X2 | X3 | X4 | X5 | X6 | X7 |
|----|----|----|----|----|----|----|----|----|
| Y1 | A(X7,Y1) |          |          | A(X0,Y2) | A(X6,Y2) |          | A(X1,Y2) |          |
| Y2 |          | A(X5,Y2) | A(X6,Y1) |          |          | A(X5,Y1) |          | A(X2,Y1) |
| Y3 |          | A(X3,Y1) |          | A(X2,Y2) |          | A(X0,Y1) |          |          |
| Y4 | A(X4,Y2) |          | A(X3,Y2) |          | A(X4,Y1) |          | A(X7,Y2) | A(X1,Y1) |

FIG. 5
|  | X0 | X1 | X2 | X3 | X4 | X5 | X6 | X7 |
|---|---|---|---|---|---|---|---|---|
| Y1 | 1 | 1 | 0 | 1 | 0 | 0 | 1 | 1 |
| Y2 | 1 | 0 | 1 | 0 | 0 | 0 | 0 | 1 |
| Y3 | 0 | 0 | 1 | 1 | 1 | 0 | 1 | 0 |
| Y4 | 0 | 1 | 0 | 1 | 1 | 0 | 1 | 1 |
FIG. 6
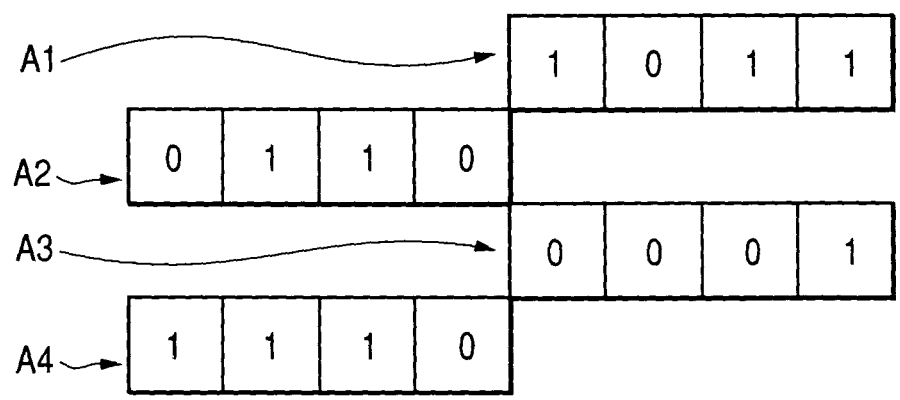
FIG. 7
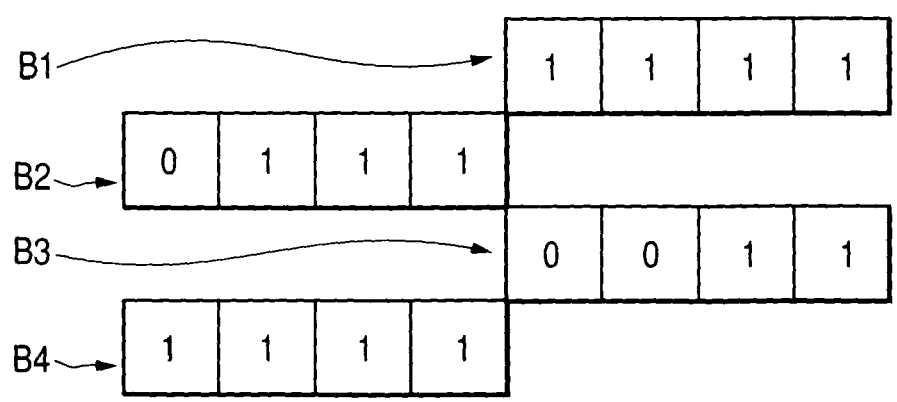

FIG. 8

|    | X0 | X1 | X2 | X3 | X4 | X5 | X6 | X7 |
|----|----|----|----|----|----|----|----|-----|
| Y1 | 0  | 1  | 1  | 1  | 1  | 1  | 1  | 1  |
| Y2 | 1  | 1  | 1  | 1  | 0  | 0  | 1  | 1  |

FIG. 9

|    | X0 | X1 | X2 | X3 | X4 | X5 | X6 | X7 |
|----|----|----|----|----|----|----|----|-----|
| Y1 | 0  | 1  | 0  | 0  | 0  | 0  | 0  | 1  |
| Y2 | 0  | 1  | 0  | 0  | 1  | 1  | 0  | 0  |
| Y3 | 0  | 0  | 0  | 1  | 0  | 1  | 1  | 0  |
| Y4 | 0  | 1  | 0  | 0  | 1  | 1  | 1  | 1  |

FIG. 10

|    | X0 | X1 | X2 | X3 | X4 | X5 | X6 | X7 |
|----|----|----|----|----|----|----|----|-----|
| Y1 | 1  | 1  | 0  | 1  | 1  | 0  | 1  | 1  |
| Y2 | 0  | 0  | 1  | 0  | 1  | 1  | 0  | 1  |
| Y3 | 0  | 1  | 0  | 1  | 0  | 0  | 1  | 0  |
| Y4 | 0  | 1  | 1  | 0  | 1  | 1  | 1  | 1  |

DEVICE AUTHENTICATION SYSTEM

BACKGROUND OF THE INVENTION

1. Field of the Invention

This invention generally relates to a device authentication system for verifying that an accessory device connected to a main device is genuine or legitimate to the main device. This invention specifically relates to a device authentication system for verifying that a battery connected to a video camera is genuine or legitimate to the video camera. This invention also relates to an authenticating device and a device to be authenticated. Furthermore, this invention relates to a method used by a device authentication system or an authenticating device.

2. Description of the Related Art

It is recommendable to use a genuine device as an accessory device connected to a main device in operation reliability, safety, and performance. In the case of video cameras, there are accessory batteries specified by video camera makers. It is desirable that such a specified battery is used as an accessory battery connected to a video camera.

Japanese patent application publication number 11-8618/1999 discloses a device authentication system in which first and second devices have a same group of private keys. The first device generates a random number, and encrypts the generated random number with one of the private keys to generate a first encrypted random number. The first device sends the first encrypted random number to the second device. The second device decrypts the first encrypted random number through the use of the private key group to generate a decrypted random number. The second device encrypts the decrypted random number with one of the private keys to generate a second encrypted random number. The second device returns the second encrypted random number to the first device. The first device decrypts the second encrypted random number through the use of the private key group to generate a recovered random number. The first device compares the recovered random number with the original random number. When the result of the comparison indicates that the recovered random number is equal to the original random number, the first device concludes the second device to be legitimate.

In the device authentication system of Japanese application 11-8618/1999, the encryption and decryption using the private key group necessitate complicated computation procedures, and cause a great data processing load. Therefore, the first device takes a long time to authenticate the second device. It is necessary to equip each of the first and second devices with a nonvolatile memory storing the group of the private keys.

SUMMARY OF THE INVENTION

It is a first object of this invention to provide a simple device authentication system.

It is a second object of this invention to provide an authenticating device and a device to be authenticated in a simple device authentication system.

It is a third object of this invention to provide a simple method used by a device authentication system or an authenticating device.

A first aspect of this invention provides an authenticating device for authenticating a device to be authenticated. The authenticating device comprises means for generating authentication base data having N bytes, where N denotes a predetermined natural number; means for generating verification data having M bytes, where M denotes a predetermined natural number smaller than the predetermined natural number N; means for embedding the generated verification data in the generated authentication base data according to a first prescribed embedding pattern to generate authentication data; means for sending the generated authentication data toward the device to be authenticated; means for receiving authentication reply data from the device to be authenticated, the authentication reply data having L bytes, where L denotes a predetermined natural number greater than the predetermined natural number M; means for extracting verification reply data from the received authentication reply data according to a second prescribed embedding pattern, the extracted verification reply data having M bytes; means for dividing the extracted verification data into first data segments; means for dividing the verification data into second data segments which correspond to the first data segments respectively; means for adding different values to each of the second data segments to obtain different addition results for each of the second data segments; means for deciding whether or not one of the obtained different addition results for each of the second data segments is equal to corresponding one of the first data segments; means for concluding that the device to be authenticated is genuine in cases where one of the obtained different addition results for each of the second data segments is equal to corresponding one of the first data segments; and means for concluding that the device to be authenticated is not genuine in cases where none of the obtained different addition results for at least one of the second data segments are equal to corresponding one of the first data segments.

A second aspect of this invention is based on the first aspect thereof, and provides an authenticating device wherein the first and second prescribed embedding patterns are equal to each other.

A third aspect of this invention is based on the first aspect thereof, and provides an authenticating device wherein the first and second prescribed embedding patterns are different from each other.

A fourth aspect of this invention provides a device to be authenticated by an authenticating device. The device to be authenticated comprises means for receiving authentication data from the authenticating device, the received authentication data having N bytes, where N denotes a predetermined natural number; means for extracting verification data from the received authentication data according to a first prescribed embedding pattern, the extracted verification data having M bytes, where M denotes a predetermined natural number smaller than the predetermined natural number N; means for dividing the extracted verification data into first data segments; means for generating random numbers each in a prescribed range; means for adding the generated random numbers to the first data segments to generate second data segments respectively; means for combining the generated second data segments to generate verification reply data; means for generating reply base data having L bytes, where L denotes a predetermined natural number greater than the predetermined natural number M; means for embedding the generated verification reply data in the generated reply base data according to a second prescribed embedding pattern to generate authentication reply data; and means for sending the generated authentication reply data toward the authenticating device.

A fifth aspect of this invention provides a device authentication system including an authenticating device and a device to be authenticated. The authenticating device comprises means for generating authentication base data having N bytes, where N denotes a predetermined natural number; means for generating verification data having M bytes, where M denotes a predetermined natural number smaller than the predetermined natural number N; means for embedding the generated verification data in the generated authentication base data according to a first prescribed embedding pattern to generate authentication data; means for sending the generated authentication data toward the device to be authenticated; means for receiving authentication reply data from the device to be authenticated, the authentication reply data having L bytes, where L denotes a predetermined natural number greater than the predetermined natural number M; means for extracting verification reply data from the received authentication reply data according to a second prescribed embedding pattern, the extracted verification reply data having M bytes; means for dividing the extracted verification data into first data segments; means for dividing the verification data into second data segments which correspond to the first data segments respectively; means for adding different values to each of the second data segments to obtain different addition results for each of the second data segments; means for deciding whether or not one of the obtained different addition results for each of the second data segments is equal to corresponding one of the first data segments; means for concluding that the device to be authenticated is genuine in cases where one of the obtained different addition results for each of the second data segments is equal to corresponding one of the first data segments; and means for concluding that the device to be authenticated is not genuine in cases where none of the obtained different addition results for at least one of the second data segments are equal to corresponding one of the first data segments. The device to be authenticated comprises means for receiving the authentication data from the authenticating device; means for extracting the verification data from the received authentication data according to the first prescribed embedding pattern; means for dividing the extracted verification data into third data segments; means for generating random numbers each in a prescribed range; means for adding the generated random numbers to the third data segments to generate fourth data segments respectively; means for combining the generated fourth data segments to generate the verification reply data; means for generating reply base data having L bytes; means for embedding the generated verification reply data in the generated reply base data according to the second prescribed embedding pattern to generate the authentication reply data; and means for sending the generated authentication reply data toward the authenticating device.

A sixth aspect of this invention provides an authenticating method comprising the steps of generating verification data having a plurality of bits; sending the generated verification data toward a device to be authenticated; receiving verification reply data from the device to be authenticated, wherein the verification reply data results from dividing the verification data into segments according to a prescribed rule and subjecting each of the segments to one of prescribed operations; dividing the generated verification data into the segments according to the prescribed rule; subjecting each of the segments to the prescribed operations to generate operation results respectively; deciding whether or not one of the generated operation results is equal in value to a corresponding portion of the received verification reply data; concluding that the device to be authenticated is genuine in cases where one of the generated operation results is equal in value to a corresponding portion of the received verification reply data; and concluding that the device to be authenticated is not genuine in cases where none of the generated operation results is equal in value to a corresponding portion of the received verification reply data.

A seventh aspect of this invention is based on the sixth aspect thereof, and provides an authenticating method further comprising the steps of generating authentication base data; embedding the generated verification data in the generated authentication base data to generate authentication data; sending the generated authentication data toward the device to be authenticated, and thereby sending the generated verification data toward the device to be authenticated; receiving authentication reply data, in which the verification reply data is embedded, from the device to be authenticated; and extracting the verification reply data from the received authentication reply data to get the received verification replay data.

This invention has the following advantages. It is unnecessary to introduce a large-scale circuit causing a great data processing load. Authentication can be implemented by performing simple calculation procedures. It is possible to get a high resistance to an illegal attack by a third party to steal transmitted data or analyze an authentication algorithm.

BRIEF DESCRIPTION OF THE DRAWINGS

FIG. 2 is a diagram showing an example of authentication base data P.

FIG. 3 is a diagram showing an example of verification data A.

FIG. 4 is a diagram showing an example of an embedding pattern.

FIG. 5 is a diagram showing an example of authentication data Q.

FIG. 6 is a diagram showing an example of data segments A1, A2, A3, and A4 which result from dividing the verification data A.

FIG. 7 is a diagram showing an example of data segments B1, B2, B3, and B4 which result from adding random numbers r1, r2, r3, and r4 to the data segments A1, A2, A3, and A4 respectively.

FIG. 8 is a diagram showing an example of verification reply data B.

FIG. 9 is a diagram showing an example of reply base data R.

FIG. 10 is a diagram showing an example of authentication reply data S.

DETAILED DESCRIPTION OF THE INVENTION

First Embodiment

A device authentication system in a first embodiment of this invention includes an authenticating device and a device to be authenticated. According to a first example, the authenticating device is a video camera while the device to be authenticated is a battery to be connected to the video camera for powering the latter. According to a second example, the device to be authenticated is a video camera while the authenticating device is a battery to be connected to the video camera for powering the latter. The authenticating device and the device to be authenticated are also referred to as a main device and an accessory device, respectively.

Figure 1:
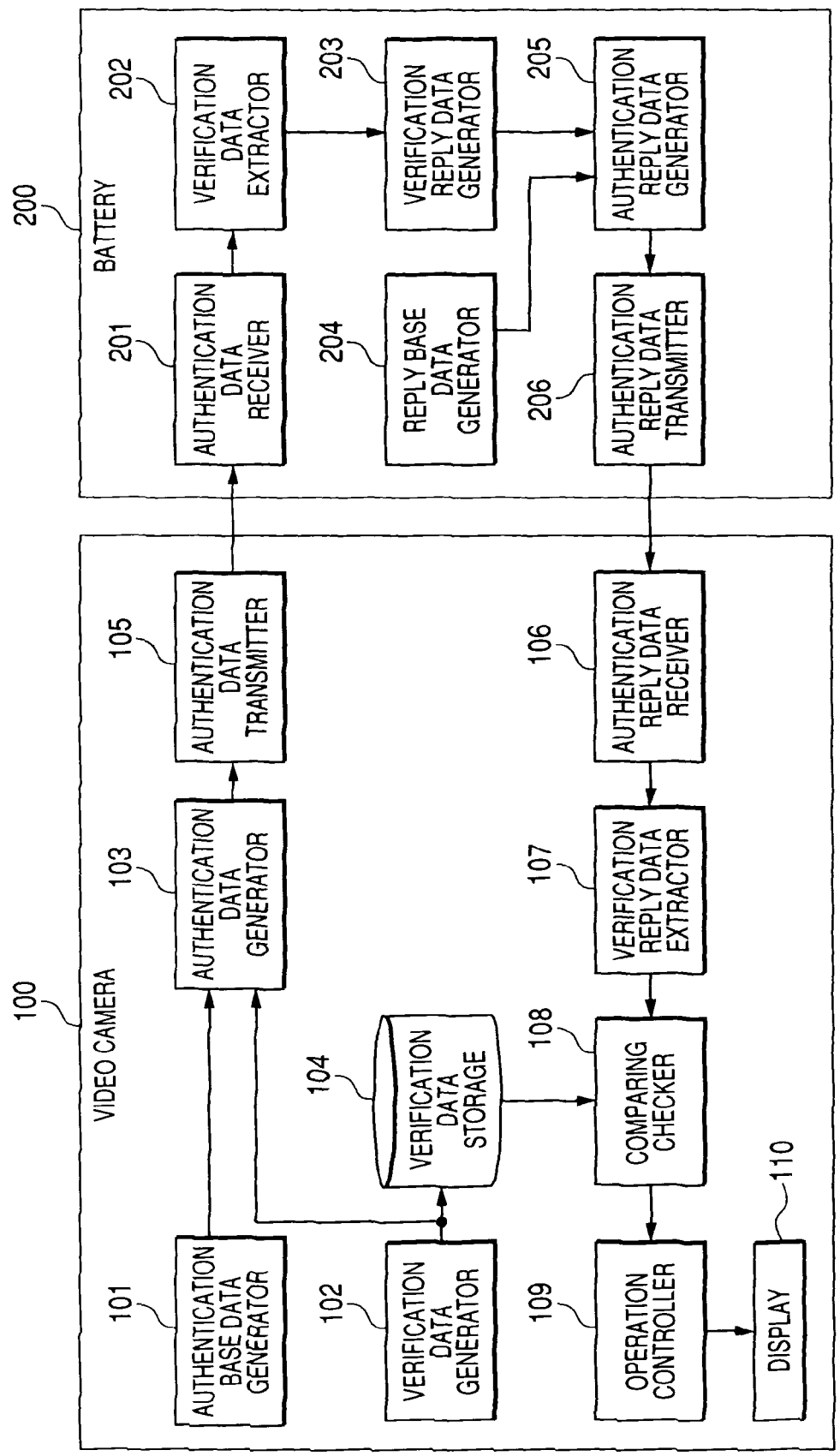
FIG. 1 is a diagram of a device authentication system in a first embodiment of this invention.

FIG. 1 shows the device authentication system in the first embodiment of this invention. The device authentication system of FIG. 1 includes a video camera 100 and a battery 200. The battery 200 can be connected to and disconnected from the video camera 100. The battery 200 serves to power the video camera 100. For example, the video camera 100 is an authenticating device while the battery 200 is a device to be authenticated.

The video camera 100 includes a CCD (Charge Coupled Device) imager and an image processing DSP (Digital Signal Processor) which are not shown in FIG. 1. The battery 200 includes a set of cells and a power feed control regulator which are not shown in FIG. 1.

With reference to FIG. 1, the video camera 100 includes an authentication base data generator 101, a verification data generator 102, an authentication data generator 103, a verification data storage 104, an authentication data transmitter 105, an authentication reply data receiver 106, a verification reply data extractor 107, a comparing checker 108, an operation controller 109, and a display 110. The display 110 is of an LCD (Liquid Crystal Display) type.

The battery 200 includes an authentication data receiver 201, a verification data extractor 202, a verification reply data generator 203, a reply base data generator 204, an authentication reply data generator 205, and an authentication reply data transmitter 206.

In the video camera 100, the authentication base data generator 101 produces authentication base data P, and feeds the authentication base data P to the authentication data generator 103.

The authentication base data P is in a prescribed arrangement consisting of N bytes, that is, 8N bits, where N denotes a predetermined natural number. Each of the bits constituting the authentication base data P is set to "0" or "1" at random. The bits constituting the authentication base data P are arranged in a sequence or a matrix. As will be mentioned later, the authentication base data P forms a base in which verification data A for authentication is embedded. The authentication base data P includes dummy data for concealing the embedded verification data A.

In the case of N=4, the bits constituting the authentication base data P are in, for example, a matrix arrangement with 4 rows and 8 columns as shown in FIG. 2. The 4 rows correspond to 4 bytes respectively, and are denoted by Y1, Y2, Y3, and Y4 respectively. The 8 columns are denoted by X0, X1, X2, X3, X4, X5, X6, and X7, respectively. Thus, each of the bits constituting the authentication base data P is denoted by P(Xm, Yn), where Xm is one of X0-X7 and Yn is one of Y1-Y4. In FIG. 2, the row Y1 is a bit sequence of "01010011", and the row Y2 is a bit sequence of "11000101". Furthermore, the row Y3 is a bit sequence of "00101010", and the row Y4 is a bit sequence of "110100001".

In the video camera 100, the verification data generator 102 produces the verification data A, and feeds the verification data A to the authentication data generator 103. In addition, the verification data generator 102 stores the verification data A into the verification data storage 104.

The verification data A is in a prescribed arrangement consisting of M bytes, that is, 8M bits, where M denotes a predetermined natural number smaller than the byte number N for the authentication base data P. Each of the bits constituting the verification data A is set to "0" or "1" at random. The bits constituting the verification data A are arranged in a sequence or a matrix.

In the case of M=2, the bits constituting the verification data A are in, for example, a matrix arrangement with 2 rows and 8 columns as shown in FIG. 3. The 2 rows correspond to 2 bytes respectively, and are denoted by Y1 and Y2 respectively. The 8 columns are denoted by X0, X1, X2, X3, X4, X5, X6, and X7, respectively. Thus, each of the bits constituting the verification data A is denoted by A(Xm, Yn), where Xm is one of X0-X7 and Yn is one of Y1 and Y2. In FIG. 3, the row Y1 is a bit sequence of "01101011", and the row Y2 is a bit sequence of "11100001".

In the video camera 100, the authentication data generator 103 produces authentication data Q from the authentication base data P and the verification data A. The authentication data generator 103 feeds the authentication data Q to the authentication data transmitter 105.

Specifically, the authentication data generator 103 produces the authentication data Q by embedding the verification data A in the authentication base data P according to a first embedding pattern prescribed by specifications. The authentication data generator 103 stores a signal representing the first prescribed embedding pattern.

FIG. 4 shows an example of the first prescribed embedding pattern. The first prescribed embedding pattern represents the positions of bits, among the bits constituting the authentication base data P, which should be replaced by the bits constituting the verification data A respectively. With reference to FIG. 4, the first prescribed embedding pattern indicates that the bits P(X0, Y1), P(X3, Y1), P(X4, Y1), P(X6, Y1), P(X1, Y2), P(X2, Y2), P(X5, Y2), P(X7, Y2), P(X1, Y3), P(X3, Y3), P(X5, Y3), P(X0, Y4), P(X2, Y4), P(X4, Y4), P(X6, Y4), and P(X7, Y4) in the authentication base data P should be replaced by the bits A(X7, Y1), A(X0, Y2), A(X6, Y2), A(X1, Y2), A(X5, Y2), A(X6, Y1), A(X5, Y1), A(X2, Y1), A(X3, Y1), A(X2, Y2), A(X0, Y1), A(X4, Y2), A(X3, Y2), A(X4, Y1), A(X7, Y2), and A(X1, Y1) constituting the verification data A respectively.

According to the first prescribed embedding pattern, the authentication data generator 103 implements the replacement of the bits in the authentication base data P with the bits constituting the verification data A. The authentication data generator 103 holds unchanged the other bits in the authentication base data P. Thereby, the authentication data generator 103 embeds the verification data A in the authentication base data P, and consequently generates the authentication data Q. The bits in the authentication base data P which remain in the authentication data Q form dummy data for concealing the embedded verification data A. As previously mentioned, the authentication data generator 103 feeds the authentication data Q to the authentication data transmitter 105.

The number of the bits constituting the authentication data Q is equal to that of the bits constituting the authentication base data P. The authentication data Q is in a prescribed arrangement consisting of N bytes, that is, 8N bits. The bits constituting the authentication data Q are arranged in a sequence or a matrix.

In the case of N=4, the bits constituting the authentication data Q are in, for example, a matrix arrangement with 4 rows and 8 columns as shown in FIG. 5. The 4 rows correspond to 4 bytes respectively, and are denoted by Y1, Y2, Y3, and Y4 respectively. The 8 columns are denoted by X0, X1, X2, X3, X4, X5, X6, and X7, respectively. Thus, each of the bits constituting the authentication data Q is denoted by Q(Xm, Yn), where Xm is one of X0-X7 and Yn is one of Y1-Y4. In FIG. 5, the row Y1 is a bit sequence of "11010011", and the row Y2 is a bit sequence of "10100001". Furthermore, the row Y3 is a bit sequence of "01010", and the row Y4 is a bit sequence of "01011011".

In the video camera 100, the verification data storage 104 stores the verification data A produced by the verification data generator 102. The comparing checker 108 can read out the verification data A from the verification data storage 104.

The authentication data transmitter 105 of the video camera 100 sends the authentication data Q to the battery 200.

The authentication data receiver 201 of the battery 200 receives the authentication data Q from the authentication data transmitter 105 of the video camera 100. The authentication data receiver 201 feeds the received authentication data Q to the verification data extractor 202.

In the battery 200, the verification data extractor 202 stores a signal representing the first prescribed embedding pattern used by the authentication data generator 103 of the video camera 100. The verification data extractor 202 extracts the verification data A from the authentication data Q according to the first prescribed embedding pattern by implementing operation inverse with respect to the operation of the authentication data generator 103 of the video camera 100. Specifically, the verification data extractor 202 extracts, from the authentication data Q, the bits constituting the verification data A and being in positions designated by the first prescribed embedding pattern. The verification data extractor 202 feeds the extracted verification data A to the verification reply data generator 203.

In the battery 200, the verification reply data generator 203 processes the verification data A according to a prescribed algorithm to generate verification reply data B. In other words, the verification reply data generator 203 converts the verification data A into the verification reply data B according to the prescribed algorithm.

A description will be given below as to an example of the prescribed algorithm and an example of operation of the verification reply data generator 203.

According to an example of the prescribed algorithm, the verification reply data generator 203 operates as follows. The verification reply data generator 203 divides the verification data A into 1-byte blocks. Furthermore, the verification reply data generator 203 divides each of the 1-byte blocks into two 4-bit segments, that is, first and second 4-bit segments. The first 4-bit segment is assigned four higher bits in the corresponding 1-byte block while the second 4-bit segment is assigned four lower bits therein. Thus, for example, the verification reply data generator 203 divides the 2-byte verification data A of FIG. 3 into four 4-bit data segments A1, A2, A3, and A4 which are in logic states of "1011", "00110", "0001", and "1110" respectively as shown in FIG. 6.

Subsequently, the verification reply data generator 203 produces random numbers r1, r2, r3, and r4 each in the range of "1" to "4" in decimal notation, that is, in the range of "001" to "100" in binary notation. Then, the verification reply data generator 203 adds the data segment A1 and the random number r1 to get a data segment B1. The verification reply data generator 203 adds the data segment A2 and the random number r2 to get a data segment B2. The verification reply data generator 203 adds the data segment A3 and the random number r3 to get a data segment B3. The verification reply data generator 203 adds the data segment A4 and the random number r4 to get a data segment B4. For example, in the case where the random numbers r1, r2, r3, and r4 are equal to "4", "1", "2", and "1" in decimal notation respectively, and where the data segments A1, A2, A3, and A4 are in logic states of "1011", "0110", "0001", and "1110" respectively (see FIG. 6), the data segments B1, B2, B3, and B4 assume binary values of "1111", "0111", "0011", and "1111" respectively as shown in FIG. 7. When the addition causes a carry and the result of the addition exceeds "1111", the highest bit (the fifth-place bit) in the addition result is discarded and only the four lower bits therein are used as corresponding one of the data segments B1, B2, B3, and B4.

Then, the verification reply data generator 203 combines the data segments B1 and B2 into a first 1-byte data block. The verification reply data generator 203 combines the data segments B3 and B4 into a second 1-byte data block. Thereafter, the verification reply data generator 203 combines the first and second 1-byte data blocks to generate the verification reply data B.

The verification reply data B is in a prescribed arrangement consisting of M bytes, that is, 8M bits. The bits constituting the verification reply data B are arranged in a sequence or a matrix.

In the case of M=2, the bits constituting the verification reply data B are in, for example, a matrix arrangement with 2 rows and 8 columns as shown in FIG. 8. The 2 rows correspond to 2 bytes respectively, and are denoted by Y1 and Y2 respectively. The 8 columns are denoted by X0, X1, X2, X3, X4, X5, X6, and X7, respectively. Thus, each of the bits constituting the verification reply data B is denoted by B(Xm, Yn), where Xm is one of X0-X7 and Yn is one of Y1 and Y2. In FIG. 8, the row Y1 is a bit sequence of "01111111", and the row Y2 is a bit sequence of "11110011".

It should be noted that the verification reply data generator 203 may divide the verification data A into two, three, five or more data segments. The number of bits constituting each of the data segments may differ from four. Each of the random numbers r1, r2, r3, and r4 may be in a prescribed range different from the range of "1" to "4" in decimal notation. The verification reply data generator 203 may utilize another algorithm for generating verification reply data B from the verification data A.

In the battery 200, the verification reply data generator 203 feeds the verification reply data B to the authentication reply data generator 205. The reply base data generator 204 produces reply base data R, and feeds the reply base data R to the authentication reply data generator 205.

The reply base data R is in a prescribed arrangement consisting of L bytes, that is, 8L bits, where L denotes a predetermined natural number greater than the byte number M for the verification reply data B. Each of the bits constituting the reply base data R is set to "0" or "1" at random. The bits constituting the reply base data R are arranged in a sequence or a matrix. As will be mentioned later, the reply base data R forms a base in which the verification reply data B is embedded. The reply base data R includes dummy data for concealing the embedded verification reply data B.

In the case of L=4, the bits constituting the reply base data R are in, for example, a matrix arrangement with 4 rows and 8 columns as shown in FIG. 9. The 4 rows correspond to 4 bytes respectively, and are denoted by Y1, Y2, Y3, and Y4 respectively. The 8 columns are denoted by X0, X1, X2, X3, X4, X5, X6, and X7, respectively. Thus, each of the bits constituting the reply base data R is denoted by R(Xm, Yn), where Xm is one of X0-X7 and Yn is one of Y1-Y4. In FIG. 9, the row Y1 is a bit sequence of "01000001", and the row Y2 is a bit sequence of "01001100". Furthermore, the row Y3 is a bit sequence of "00010110", and the row Y4 is a bit sequence of "01001111". In general, the reply base data R differs in logic state from the authentication base data P produced by the authentication base data generator 101 of the video camera 100.

It should be noted that the byte number L for the reply base data R may differ from the byte number N for the authentication base data P or the authentication data Q.

In the battery 200, the authentication reply data generator 205 produces authentication reply data S from the reply base data R and the verification reply data B. The authentication reply data generator 205 feeds the authentication reply data S to the authentication reply data transmitter 206.

Specifically, the authentication reply data generator 205 produces the authentication reply data S by embedding the verification reply data B in the reply base data R according to a second embedding pattern prescribed by the specifications. The authentication reply data generator 205 stores a signal representing the second prescribed embedding pattern. Preferably, the second prescribed embedding pattern is the same as the first prescribed embedding pattern used by the authentication data generator 103 of the video camera 100. Alternatively, the second prescribed embedding pattern may differ from the first prescribed embedding pattern.

The second prescribed embedding pattern represents the positions of bits, among the bits constituting the reply base data R, which should be replaced by the bits constituting the verification reply data B respectively. For example, the second prescribed embedding pattern indicates that the bits R(X0, Y1), R(X3, Y1), R(X4, Y1), R(X6, Y1), R(X1, Y2), R(X2, Y2), R(X5, Y2), R(X7, Y2), R(X1, Y3), R(X3, Y3), R(X5, Y3), R(X0, Y4), R(X2, Y4), R(X4, Y4), R(X6, Y4), and R(X7, Y4) in the reply base data R should be replaced by the bits B(X7, Y1), B(X0, Y2), B(X6, Y2), B(X1, Y2), B(X5, Y2), B(X6, Y1), B(X5, Y1), B(X2, Y1), B(X3, Y1), B(X2, Y2), B(X0, Y1), B(X4, Y2), B(X3, Y2), B(X4, Y1), B(X7, Y2), and B(X1, Y1) constituting the verification reply data B respectively.

According to the second prescribed embedding pattern, the authentication reply data generator 205 implements the replacement of the bits in the reply base data R with the bits constituting the verification reply data B. The authentication reply data generator 205 holds unchanged the other bits in the reply base data R. Thereby, the authentication reply data generator 205 embeds the verification reply data B in the reply base data R, and consequently generates the authentication reply data S. The bits in the reply base data R which remain in the authentication reply data S form dummy data for concealing the embedded verification reply data B. As previously mentioned, the authentication reply data generator 205 feeds the authentication reply data S to the authentication reply data transmitter 206.

The number of the bits constituting the authentication reply data S is equal to that of the bits constituting the reply base data R. The authentication reply data S is in a prescribed arrangement consisting of L bytes, that is, 8L bits. The bits constituting the authentication reply data S are arranged in a sequence or a matrix.

In the case of L=4, the bits constituting the authentication reply data S are in, for example, a matrix arrangement with 4 rows and 8 columns as shown in FIG. 10. The 4 rows correspond to 4 bytes respectively, and are denoted by Y1, Y2, Y3, and Y4 respectively. The 8 columns are denoted by X0, X1, X2, X3, X4, X5, X6, and X7, respectively. Thus, each of the bits constituting the authentication reply data S is denoted by S(Xm, Yn), where Xm is one of X0-X7 and Yn is one of Y1-Y4. In FIG. 10, the row Y1 is a bit sequence of "11011011", and the row Y2 is a bit sequence of "00101101".

Furthermore, the row Y3 is a bit sequence of "01010010", and the row Y4 is a bit sequence of "01101111".

The authentication reply data transmitter 206 of the battery 200 sends the authentication reply data S to the video camera 100.

The authentication reply data receiver 106 of the video camera 100 receives the authentication reply data S from the authentication reply data transmitter 206 of the battery 200. The authentication reply data receiver 106 feeds the received authentication reply data S to the verification reply data extractor 107.

In the video camera 100, the verification reply data extractor 107 stores a signal representing the second prescribed embedding pattern used by the authentication reply data generator 205 of the battery 200. The verification reply data extractor 107 extracts the verification reply data B from the authentication reply data S according to the second prescribed embedding pattern by implementing operation inverse with respect to the operation of the authentication reply data generator 205 of the battery 200. Specifically, the verification reply data extractor 107 extracts, from the authentication reply data S, the bits constituting the verification reply data B and being in positions designated by the second prescribed embedding pattern. The verification reply data extractor 107 feeds the extracted verification reply data B to the comparing checker 108.

In the video camera 100, the comparing checker 108 reads out the verification data A from the verification data storage 104. According to a prescribed algorithm, the comparing checker 108 compares the verification data A and the verification reply data B with each other and checks whether or not the verification reply data B is the same as that correctly generated from the verification data A.

A description will be given below as to an example of the prescribed algorithm and an example of operation of the comparing checker 108.

According to an example of the prescribed algorithm, the comparing checker 108 operates as follows. The comparing checker 108 divides the verification reply data B into 1-byte blocks. Furthermore, the comparing checker 108 divides each of the 1-byte blocks into two 4-bit segments, that is, first and second 4-bit segments. The first 4-bit segment is assigned four higher bits in the corresponding 1-byte block while the second 4-bit segment is assigned four lower bits therein. Thus, for example, the comparing checker 108 divides the 2-byte verification reply data B of FIG. 8 into four 4-bit data segments B1, B2, B3, and B4 which are in logic states of "1111", "0111", "0011", and "1111" respectively as shown in FIG. 7.

The comparing checker 108 divides the verification data A into 1-byte blocks. Furthermore, the comparing checker 108 divides each of the 1-byte blocks into two 4-bit segments, that is, first and second 4-bit segments. The first 4-bit segment is assigned four higher bits in the corresponding 1-byte block while the second 4-bit segment is assigned four lower bits therein. Thus, for example, the comparing checker 108 divides the 2-byte verification data A of FIG. 3 into four 4-bit data segments A1, A2, A3, and A4 which are in logic states of "1011", "0110", "00011", and "1110" respectively as shown in FIG. 6.

Subsequently, the comparing checker 108 refers to integers "u" and "v" which vary in the range of "1" to "4". The comparing checker 108 adds the value "v" to the data segment Au (A1, A2, A3, or A4), and thereby obtains an addition result "α". The comparing checker 108 compares the addition result "α" and the data segment Bu (B1, B2, B3, or B4) to decide whether or not they are equal. Initially, the integers "u" and "v" are equal to "1", and therefore the comparing checker 108 compares the addition result "α" (A1+1) and the data segment B1 to decide whether or not they are equal. When the addition causes a carry and the result of the addition exceeds "1111", the highest bit (the fifth-place bit) in the addition result is discarded and only the four lower bits therein are used as an effective addition result "α". The data segment Au and the data segment Bu occupy the same areas of the verification data A and the verification reply data B, respectively.

When the addition result "α" and the data segment Bu are not equal, the comparing checker 108 increments the value "v" by "1". Then, the comparing checker 108 adds the value "v" to the data segment Au, and thereby obtains an updated addition result "α". The comparing checker 108 compares the updated addition result "α" and the data segment Bu to decide whether or not they are equal. Steps similar to the above steps are performed as the value "v" is incremented to "3" or "4". In the event that the addition result "α" and the data segment Bu continue to be not equal while the value "v" increases from "1" to "4", the comparing checker 108 notifies an authentication failure to the operation controller 109.

On the other hand, when the addition result "α" and the data segment Bu are equal, the comparing checker 108 concludes authentication about the data segment Bu to be successful and increments the value "u" by "1". Then, the comparing checker 108 adds the value "v" to the data segment Au, and thereby obtains an addition result "α". The comparing checker 108 compares the addition result "α" and the data segment Bu to decide whether or not they are equal again.

For example, the verification data A, the data segments A1-A4, the verification reply data B, and the data segments B1-B4 are in the logic states of FIGS. 3, 6, 7, and 8. In this case, the comparing checker 108 first adds "1" (the value "v") to "1011" (the data segment A1), and obtains "1100" as an addition result "α". The comparing checker 108 compares "1100" (the addition result "α") and "1111" (the data segment B1). Since "1100" and "1111" are not equal, the comparing checker 108 increments the value "v" to "2". The comparing checker 108 adds "2" (the value "v") to "1011" (the data segment A1), and obtains "1101" as an addition result "α". The comparing checker 108 compares "1101" (the addition result "α") and "1111" (the data segment B1). Since "1101" and "1111" are not equal, the comparing checker 108 increments the value "v" to "3". The comparing checker 108 adds "3" (the value "v") to "1011" (the data segment A1), and obtains "1110" as an addition result "α". The comparing checker 108 compares "1110" (the addition result "α") and "1111" (the data segment B1). Since "1110" and "1111" are not equal, the comparing checker 108 increments the value "v" to "4". The comparing checker 108 adds "4" (the value "v") to "1011" (the data segment A1), and obtains "1111" as an addition result "α". The comparing checker 108 compares "1111" (the addition result "α") and "1111" (the data segment B1). Since "1111" and "1111" are equal, the comparing checker 108 concludes authentication about the data segment B1 to be successful and increments the value "u" by "1". For authentication about each of the data segments B2, B3, and B4, the comparing checker 108 performs steps similar to the above steps.

In the case where the addition result "α" (Au+v being one of Au+1, Au+2, Au+3, and Au+4) and the data segment Bu are equal for each of "1", "2", "3", and "4" taken by the value "u", that is, in the case where the data segments B1, B2, B3, and B4 are in the ranges of A1+1 to A1+4, A2+1 to A2+4, A3+1 to A3+4, and A4+1 to A4+4 respectively, the comparing checker 108 concludes the battery 200 to be authentic (genuine or legitimate). Then, the comparing checker 108 notifies an authentication success to the operation controller 109.

Generally, there is a plurality of solutions each causing an authentication success. The plurality of solutions makes it difficult to infer regularity leading to a solution causing an authentication success, and effectively prevents break of security about the algorithms used for the authentication and illegal generation of the authentication data A and the authentication reply data B.

It should be noted that the verification reply data generator 203 in the battery 200 may generate the data segments B1, B2, B3, and B4 by adding fixed values to the data segments A1, A2, A3, and A4 respectively. In this case, the fixed values are prescribed by the specifications. Furthermore, the comparing checker 108 in the video camera 100 adds the fixed values to the data segments A1, A2, A3, and A4, and compares the addition results and the data segments B1, B2, B3, and B4 to decide whether or not they are equal.

Figure 11:
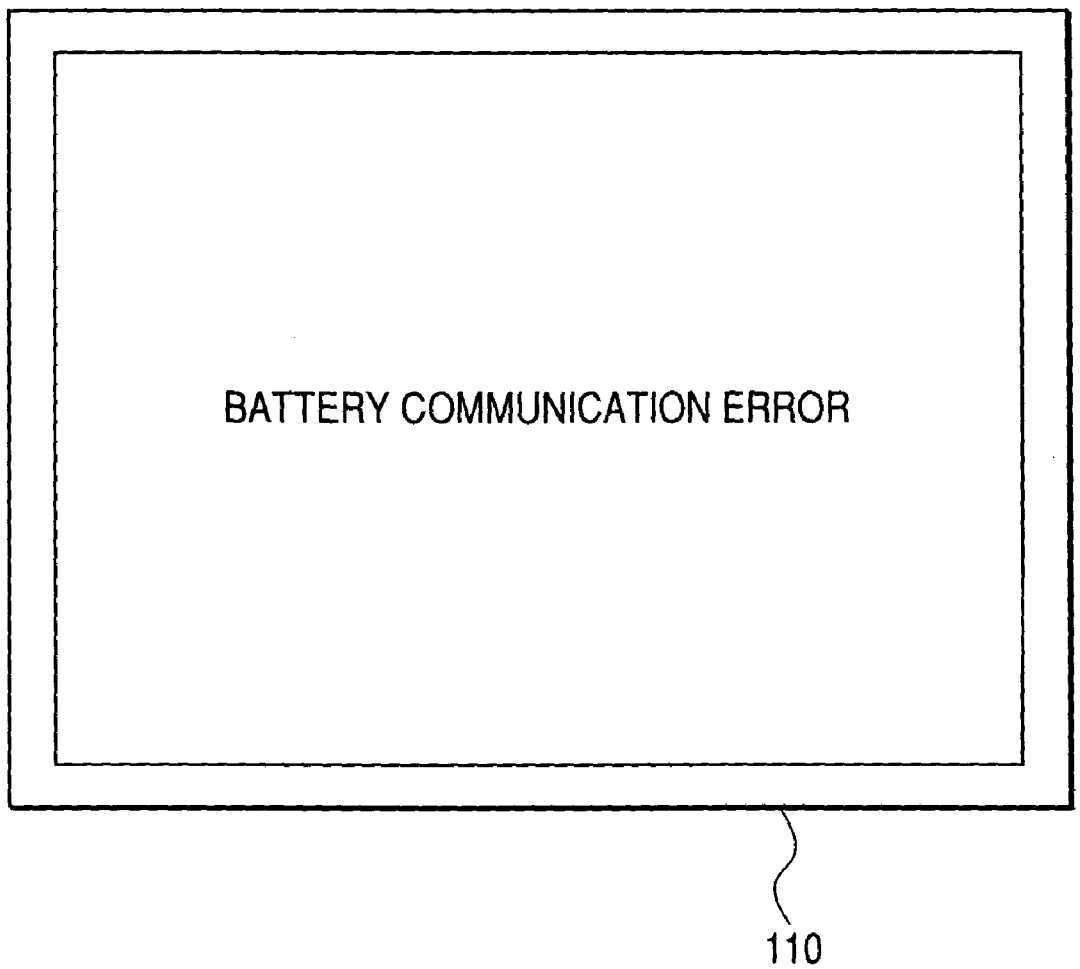
FIG. 11 is a diagram showing an example of a picture indicated by a display in FIG. 1.

The operation controller 109 of the video camera 100 controls operation of other portions of the video camera 100 in response to an authentication success or an authentication failure notified by the comparing checker 108. When being notified of an authentication success by the comparing checker 108, the operation controller 109 enables power supply connection between the video camera 100 and the battery 200 and allows the video camera 100 to be normally fed with power from the battery 200. On the other hand, when being notified of an authentication failure by the comparing checker 108, the operation controller 109 disables the power supply connection between the video camera 100 and the battery 200 and inhibits the video camera 100 from being fed with power from the battery 200. In addition, the operation controller 109 controls the video camera 100 to indicate the authentication failure to a user. For example, the operation controller 109 controls the display 110 to indicate a battery communication error as shown in FIG. 11. The operation controller 109 may control the battery 200 rather than the video camera 100 to inhibit the video camera 100 from being fed with power from the battery 200.

Figure 12:
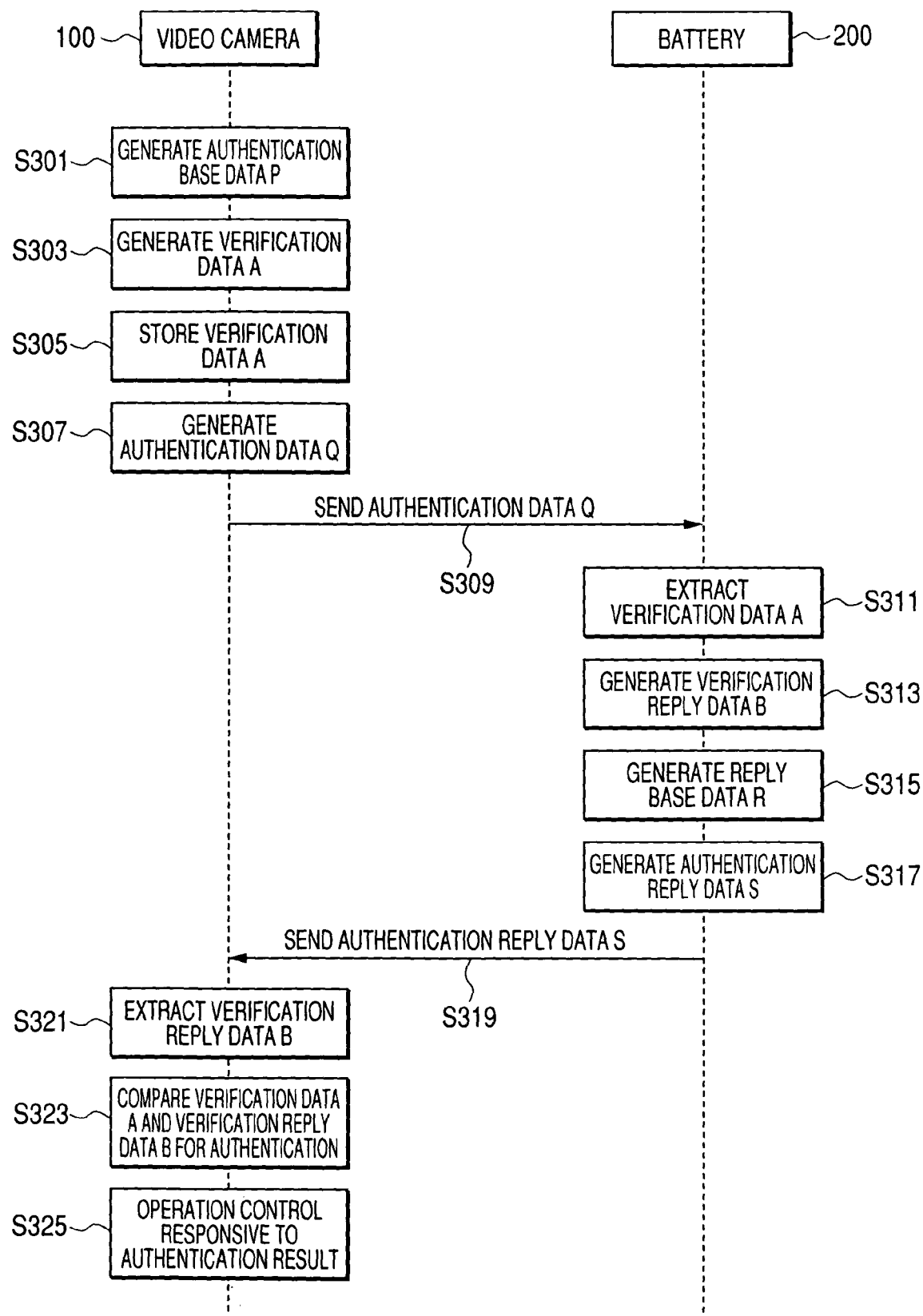
FIG. 12 is a diagram showing an example of communications between a video camera and a battery in FIG. 1, an example of operation of the video camera, and an example of operation of the battery.

With reference to FIG. 12, an example of communications between the video camera 100 and the battery 200, an example of operation of the video camera 100, and an example of operation of the battery 200 will be explained. The video camera 100 iteratively decides whether or not the battery 200 is connected thereto.

In FIG. 12, at a stage S301 after the video camera 100 decides that the battery 200 is connected thereto, the authentication base data generator 101 in the video camera 100 produces the 4-byte authentication base data P. The authentication base data generator 101 feeds the authentication base data P to the authentication data generator 103.

At a stage S303 following the stage S301, the verification data generator 102 in the video camera 100 produces the 2-byte verification data A. The verification data generator 102 feeds the verification data A to the authentication data generator 103.

At a stage S305 subsequent to the stage S303, the verification data generator 102 stores the verification data A into the verification data storage 104.

At a stage S307 following the stage S305, the authentication data generator 103 in the video camera 100 embeds the verification data A in the authentication base data P according to the first embedding pattern prescribed by the specifications, and thereby generates the 4-byte authentication data Q. The authentication data generator 103 feeds the authentication data Q to the authentication data transmitter 105.

At a stage S309 subsequent to the stage S307, the authentication data transmitter 105 sends the authentication data Q from the video camera 100 to the battery 200. The authentication data receiver 201 of the battery 200 receives the authentication data Q from the video camera 100. The authentication data receiver 201 feeds the received authentication data Q to the verification data extractor 202.

At a stage S311 after the stage S309, the verification data extractor 202 in the battery 200 extracts the verification data A from the authentication data Q according to the first embedding pattern prescribed by the specifications. The verification data extractor 202 feeds the extracted verification data A to the verification reply data generator 203.

At a stage S313 following the stage S311, the verification reply data generator 203 in the battery 200 processes the verification data A according to the prescribed algorithm to generate the 2-byte verification reply data B. Specifically, the verification reply data generator 203 divides the verification data A into 4-bit data segments A1, A2, A3, and A4. The verification reply data generator 203 adds the data segment A1 and the random number r1 to get the data segment B1. The verification reply data generator 203 adds the data segment A2 and the random number r2 to get the data segment B2. The verification reply data generator 203 adds the data segment A3 and the random number r3 to get the data segment B3. The verification reply data generator 203 adds the data segment A4 and the random number r4 to get the data segment B4. Each of the random numbers r1, r2, r3, and r4 is in the range of "1" to "4" in decimal notation. Then, the verification reply data generator 203 combines the data segments B1, B2, B3, and B4 to generate the 2-byte verification reply data B. The verification reply data generator 203 feeds the verification reply data B to the authentication reply data generator 205.

At a stage S315 subsequent to the stage S313, the reply base data generator 204 in the battery 200 produces the reply base data R. The reply base data generator 204 feeds the reply base data R to the authentication reply data generator 205.

At a stage S317 following the stage S315, the authentication reply data generator 205 in the battery 200 embeds the verification reply data B in the reply base data R according to the second embedding pattern prescribed by the specifications, and thereby generates the 4-byte authentication reply data S. The second prescribed embedding pattern is equal to or different from the first prescribed embedding pattern used by the authentication data generator 103 of the video camera 100. The authentication reply data generator 205 feeds the authentication reply data S to the authentication reply data transmitter 206.

At a stage S319 subsequent to the stage S317, the authentication reply data transmitter 206 sends the authentication reply data S from the battery 200 to the video camera 100. The authentication reply data receiver 106 of the video camera 100 receives the authentication reply data S from the battery 100. The authentication reply data receiver 106 feeds the received authentication reply data S to the verification reply data extractor 107.

At a stage S321 after the stage S319, the verification reply data extractor 107 in the video camera 100 extracts the verification reply data B from the authentication reply data S according to the second embedding pattern prescribed by the specifications. The verification reply data extractor 107 feeds the extracted verification reply data B to the comparing checker 108.

At a stage S323 following the stage S321, the comparing checker 108 in the video camera 100 reads out the verification data A from the verification data storage 104. The comparing checker 108 compares the verification data A and the verification reply data B with each other and checks whether or not the verification reply data B is the same as that correctly generated from the verification data A. The comparison and check by the comparing checker 108 are designed to authenticate the battery 200. Specifically, the comparing checker 108 divides the verification data A into the 4-bit data segments A1, A2, A3, and A4. The comparing checker 108 divides the verification reply data B into the 4-bit data segments B1, B2, B3, and B4. The comparing checker 108 adds "1", "2", "3", and "4" to the data segment A1 to obtain the data segments A1+1, A1+2, A1+3, and A1+4, respectively. The comparing checker 108 adds "1", "2", "3", and "4" to the data segment A2 to obtain the data segments A2+1, A2+2, A2+3, and A2+4, respectively. The comparing checker 108 adds "1", "2", "3", and 11"4" to the data segment A3 to obtain the data segments A3+1, A3+2, A3+3, and A3+4, respectively. The comparing checker 108 adds "1", "2", "3", and "4" to the data segment A4 to obtain the data segments A4+1, A4+2, A4+3, and A4+4, respectively. The comparing checker 108 decides whether or not the data segment B1 is equal to one of the data segments A1+1, A1+2, A1+3, and A1+4. The comparing checker 108 decides whether or not the data segment B2 is equal to one of the data segments A2+1, A2+2, A2+3, and A2+4. The comparing checker 108 decides whether or not the data segment B3 is equal to one of the data segments A3+1, A3+2, A3+3, and A3+4. The comparing checker 108 decides whether or not the data segment B4 is equal to one of the data segments A4+1, A4+2, A4+3, and A4+4. In the case where the data segments B1, B2, B3, and B4 are equal to ones of A1+1 to A1+4, A2+1 to A2+4, A3+1 to A3+4, and A4+1 to A4+4 respectively, the comparing checker 108 concludes the battery 200 to be authentic (genuine or legitimate). Then, the comparing checker 108 notifies an authentication success to the operation controller 109. Otherwise, the comparing checker 108 concludes the battery 200 to be not authentic. Then, the comparing checker 108 notifies an authentication failure to the operation controller 109.

At a stage S325 subsequent to the stage S323, the operation controller 109 controls the operation of the video camera 100 in response to the authentication success or the authentication failure notified by the comparing checker 108.

The video camera 100 authenticates the battery 200 in the previously-mentioned way. For authentication of the battery 200, the video camera 100 and the battery 200 perform simple computation procedures, and thereby implement generation and verification of authentication-related data. The authentication data Q sent from the video camera 100 to the battery 200 is generated by embedding the verification data A in the authentication base data P. The embedded verification data A is concealed by dummy bits in the authentication base data P. The verification data A is used for authentication of the battery 200. The authentication reply data S sent from the battery 200 to the video camera 100 is generated by embedding the verification reply data B in the reply base data R. The embedded verification reply data B is concealed by dummy bits in the reply base data R. The verification reply data B is used for authentication of the battery 200. It is difficult for a third party to steal the verification data A and the verification reply data B since they are concealed by the dummy bits. The battery 200 divides the verification data A into the data segments A1, A2, A3, and A4, and adds the random numbers r1, r2, r3, and r4 each in the prescribed range to the data segments A1, A2, A3, and A4 to get the data segments B1, B2, B3, and B4 respectively. Then, the battery 200 combines the data segments B1, B2, B3, and B4 to generate the verification reply data B. Accordingly, the verification reply data B is in a certain range with respect to the verification data A. Thus, it is difficult for a third party to get regularity in the generation of the verification reply data B from the verification data A.

Second Embodiment

A device authentication system in a second embodiment of this invention is similar to that in the first embodiment thereof except for design changes mentioned hereafter.

Figure 13:
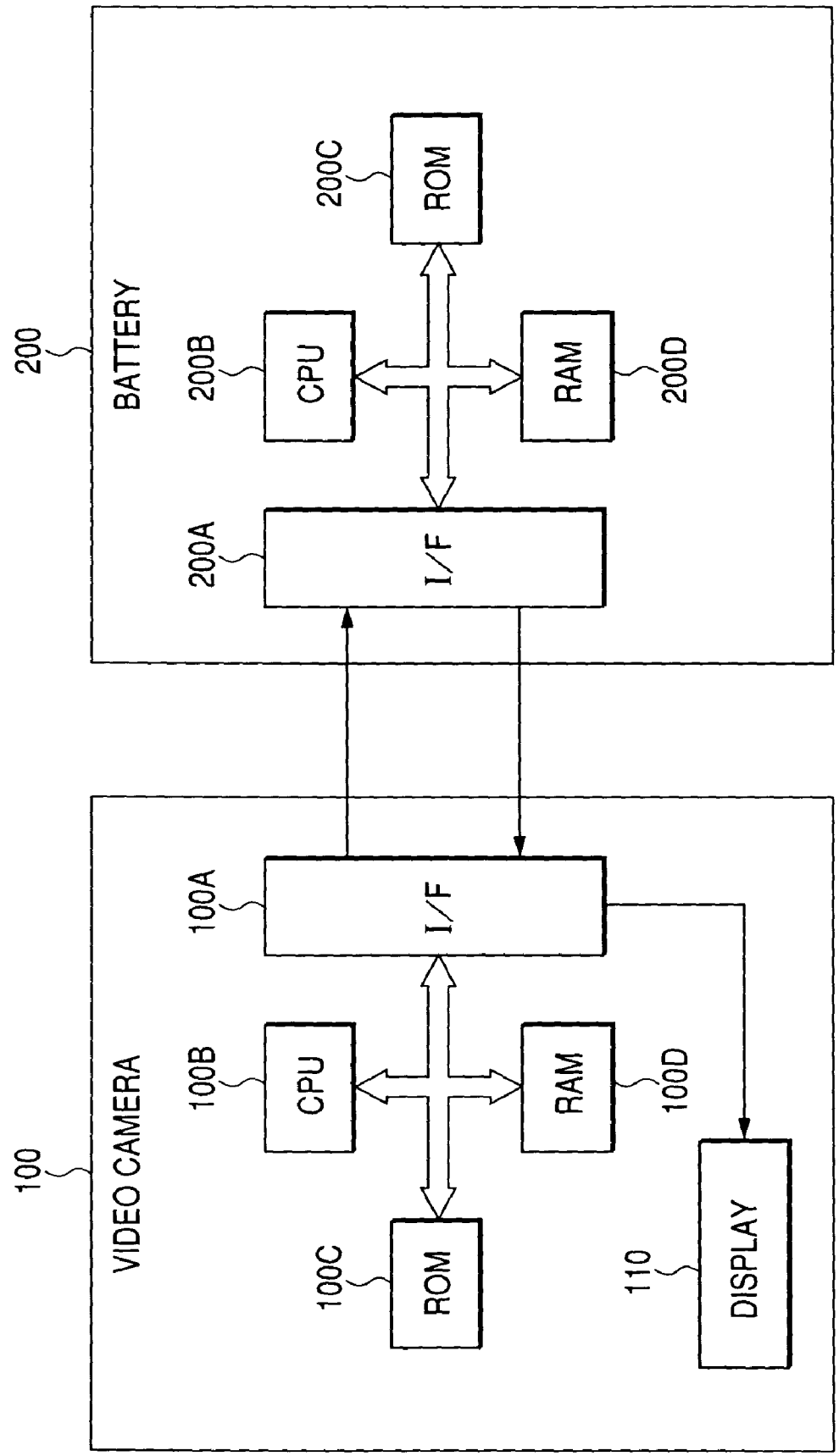
FIG. 13 is a block diagram of a device authentication system in a second embodiment of this invention.

FIG. 13 shows the device authentication system in the second embodiment of this invention. In the device authentication system of FIG. 13, the video camera 100 includes a computer system having a combination of an interface 100A, a CPU 100B, a ROM 100C, and a RAM 100D. The computer system operates in accordance with a control program (a computer program) stored in the ROM 100C. Signals representing the first and second embedding patterns prescribed by the specifications are also stored in the ROM 100C. In the video camera 100, the display 110 is connected to the interface 100A.

In the device authentication system of FIG. 13, the battery 200 includes a computer system having a combination of an interface 200A, a CPU 200B, a ROM 200C, and a RAM 200D. The computer system operates in accordance with a control program (a computer program) stored in the ROM 200C. Signals representing the first and second embedding patterns prescribed by the specifications are also stored in the ROM 200C. As the battery 200 is connected to and disconnected from the video camera, the interface 200A in the battery 200 is coupled to and uncoupled from the interface 100A in the video camera 100 respectively.

The coupling between the interfaces 100A and 200A includes not only connection for data communications therebetween but also connection for power supply from the battery 200 to the video camera 100. The interface 100A in the video camera 100 has a function of selectively enabling and disabling the power supply connection between the video camera 100 and the battery 200.

Figure 14:
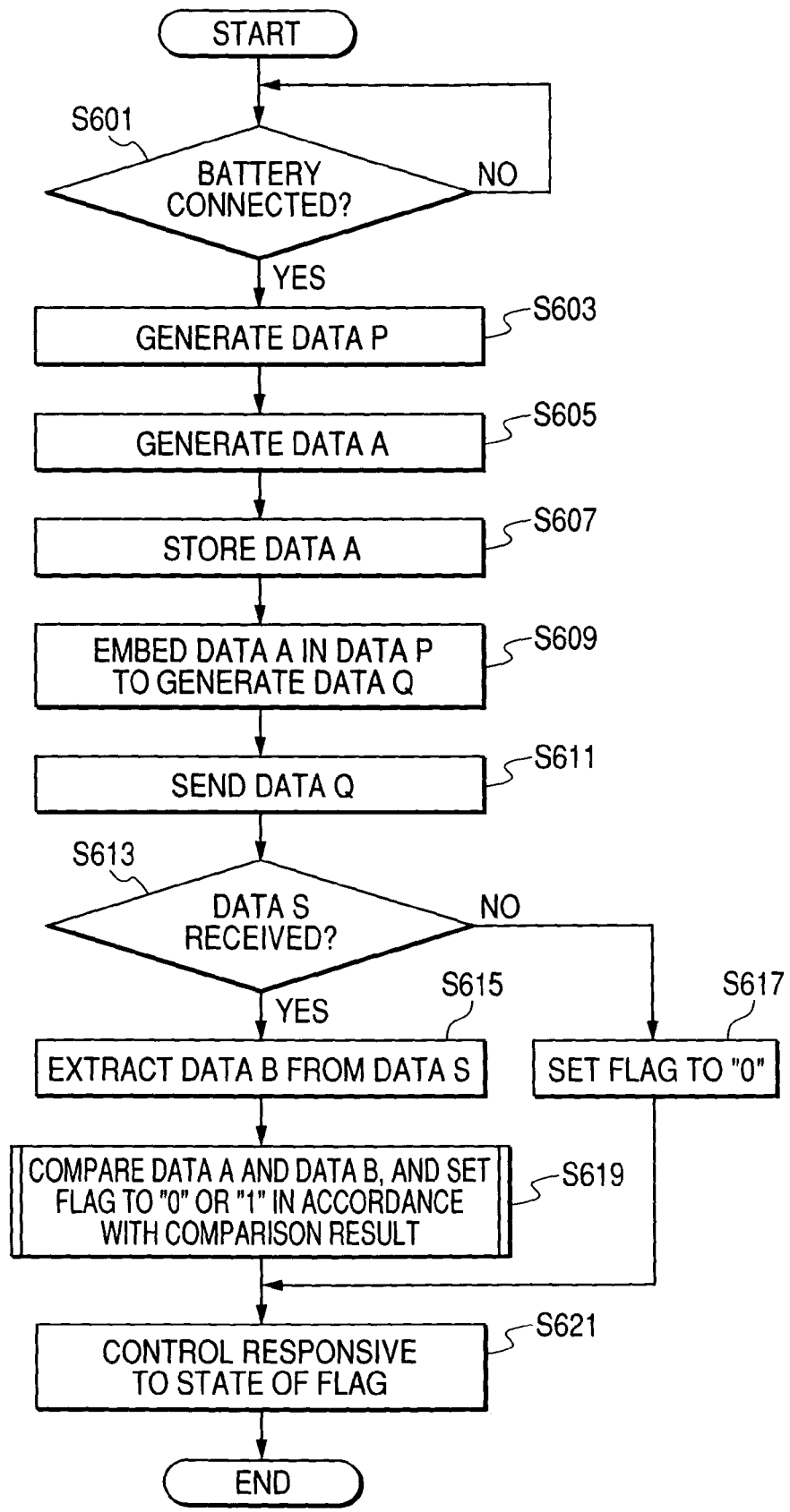
FIG. 14 is a flowchart of a segment of a control program for a computer system in a video camera in FIG. 13.

FIG. 14 is a flowchart of a segment of the control program for the computer system in the video camera 100. As shown in FIG. 14, a first step S601 of the program segment decides whether or not the battery 200 is connected to the video camera 100. When it is decided that the battery 200 is connected to the video camera 100, the program advances from the step S601 to a step S603. Otherwise, the step S601 is repeated.

The step S603 produces 4-byte random data, and uses the produced random data as the 4-byte authentication base data P.

A step S605 following the step S603 produces 2-byte random data, and uses the produced random data as the 2-byte verification data A.

A step S607 subsequent to the step S605 stores the verification data A into the RAM 100D.

A step S609 following the step S607 retrieves the first embedding pattern from the ROM 100C. The step S609 embeds the verification data A in the authentication base data P according to the retrieved first embedding pattern, and thereby generates the 4-byte authentication data Q.

A step S611 subsequent to the step S609 controls the interface 100A to send the authentication data Q to the battery 200.

A step S613 following the step S611 decides whether or not the 4-byte authentication reply data S from the battery 200 is received by the interface 100A in a predetermined time interval since the moment of the advance of the program to the step S613 from the step S611. When it is decided that the authentication reply data S is received, the program advances from the step S613 to a step S615. Otherwise, the program advances from the step S613 to a step S617.

The step S617 sets a flag to "0" to indicate an authentication failure. After the step S617, the program advances to a step S621.

The step S615 retrieves the second embedding pattern from the ROM 100C. The step S615 extracts the 2-byte verification reply data B from the received authentication reply data S according to the retrieved second embedding pattern.

A block S619 following the step S615 reads out the verification data A from the RAM 100D. The block S619 compares the read-out verification data A and the extracted verification reply data B with each other, and thereby decides whether or not the verification reply data B is the same as that correctly generated from the verification data A. When it is decided that the verification reply data B is the same as that correctly generated from the verification data A, the block S619 sets the flag to "1" to indicate an authentication success. Otherwise, the block S619 sets the flag to "0" to indicate an authentication failure. After the block S619, the program advances to the step S621.

The step S621 controls the operation of the video camera 100 in response to whether the flag is "0" or "1", that is, in response to whether the authentication succeeds or fails. When the flag is "1" (an authentication success), the step S621 controls the interface 100A to enable the power supply connection between the video camera 100 and the battery 200 and to allow the video camera 100 to be normally fed with power from the battery 200. On the other hand, when the flag is "0", the step S621 controls the interface 100A to disable the power supply connection between the video camera 100 and the battery 200 and to inhibit the video camera 100 from being fed with power from the battery 200. In addition, the step S621 controls the display 110 to indicate a battery communication error (see FIG. 11). After the step S621, the execution of the program segment ends.

Figure 15:
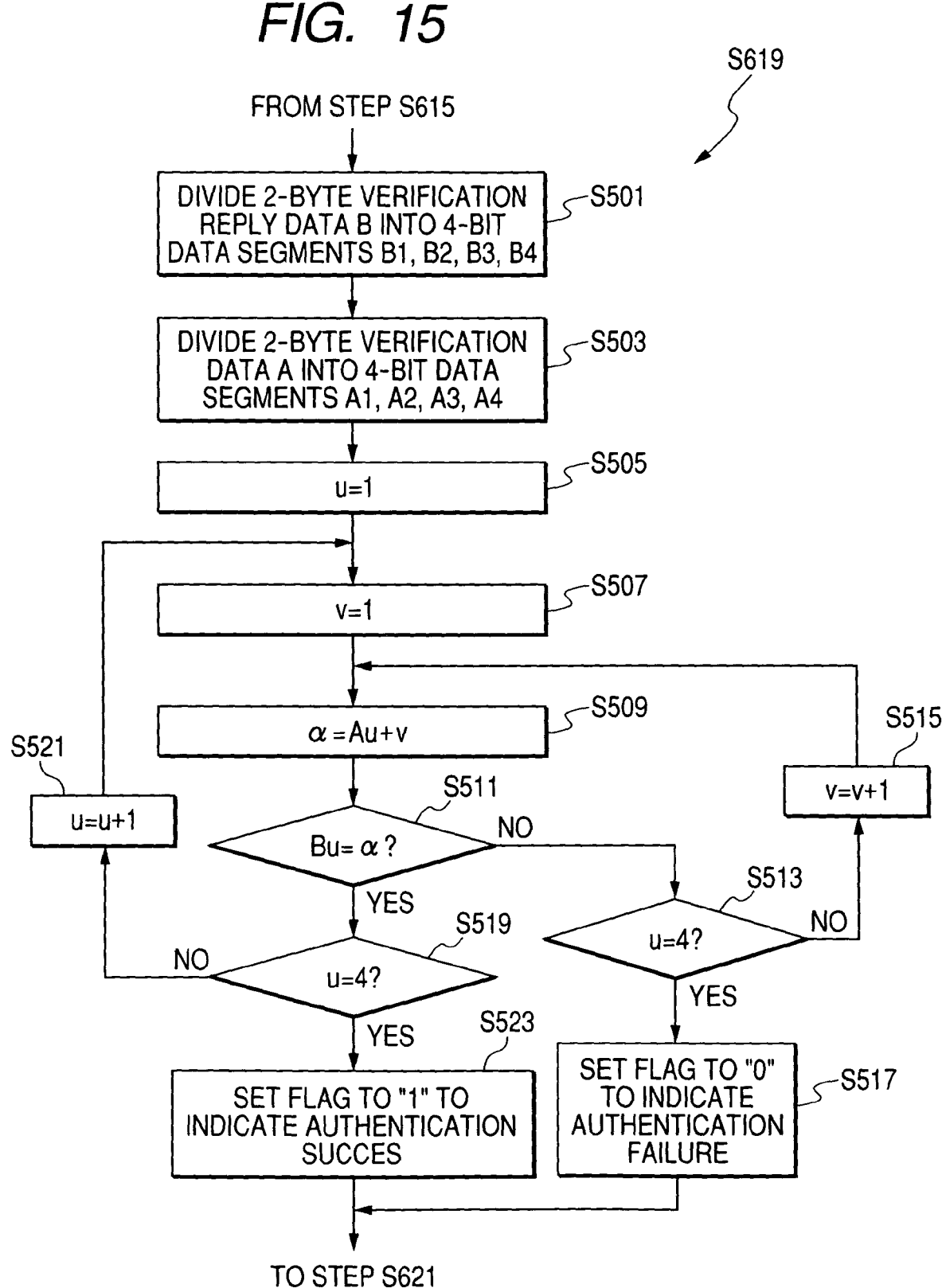
FIG. 15 is a flowchart of the details of a block in FIG. 14.

FIG. 15 shows the details of the block S619 in FIG. 14. As shown in FIG. 15, the block S619 includes a step S501 which follows the step S615 (see FIG. 14). The step S501 divides the 2-byte verification reply data B into the 4-bit data segments B1, B2, B3, and B4.

A step S503 subsequent to the step S501 reads out the 2-byte verification data A from the RAM 100D. The step S503 divides the 2-byte verification data A into the 4-bit data segments A1, A2, A3, and A4.

A step S505 following the step S503 sets the value "u" to "1". After the step S505, the program advances to a step S507.

The step S507 sets the value "v" to "1". After the step S507, the program advances to a step S509.

The step S509 adds the value "v" to the data segment Au (A1, A2, A3, or A4), and thereby obtains the addition result "α".

A step S511 following the step S509 compares the addition result "α" and the data segment Bu (B1, B2, B3, or B4) to decide whether or not they are equal. When it is decided that the addition result "α" and the data segment Bu are not equal, the program advances from the step S511 to a step S513. On the other hand, when it is decided that the addition result "α" and the data segment Bu are equal, the program advances from the step S511 to a step S519.

The step S513 decides whether or not the value "v" is equal to "4". When it is decided that the value "v" is not equal to "4", the program advances from the step S513 to a step S515. On the other hand, when it is decided that the value "v" is equal to "4", the program advances from the step S513 to a step S517.

The step S515 increments the value "v" by "1" according to the statement "v=v+1". After the step S515, the program returns to the step S509.

The step S517 sets the flag to "0" to indicate an authentication failure. After the step S517, the program advances to the step S621 (see FIG. 14).

The step S519 decides whether or not the value "u" is equal to "4". When it is decided that the value "u" is not equal to "4", the program advances from the step S519 to a step S521. On the other hand, when it is decided that the value "u" is equal to "4", the program advances from the step S519 to a step S523.

The step S521 increments the value "u" by "1" according to the statement "u=u+1". After the step S521, the program returns to the step S507.

The step S523 sets the flag to "1" to indicate an authentication success. After the step S523, the program advances to the step S621 (see FIG. 14).

Figure 16:
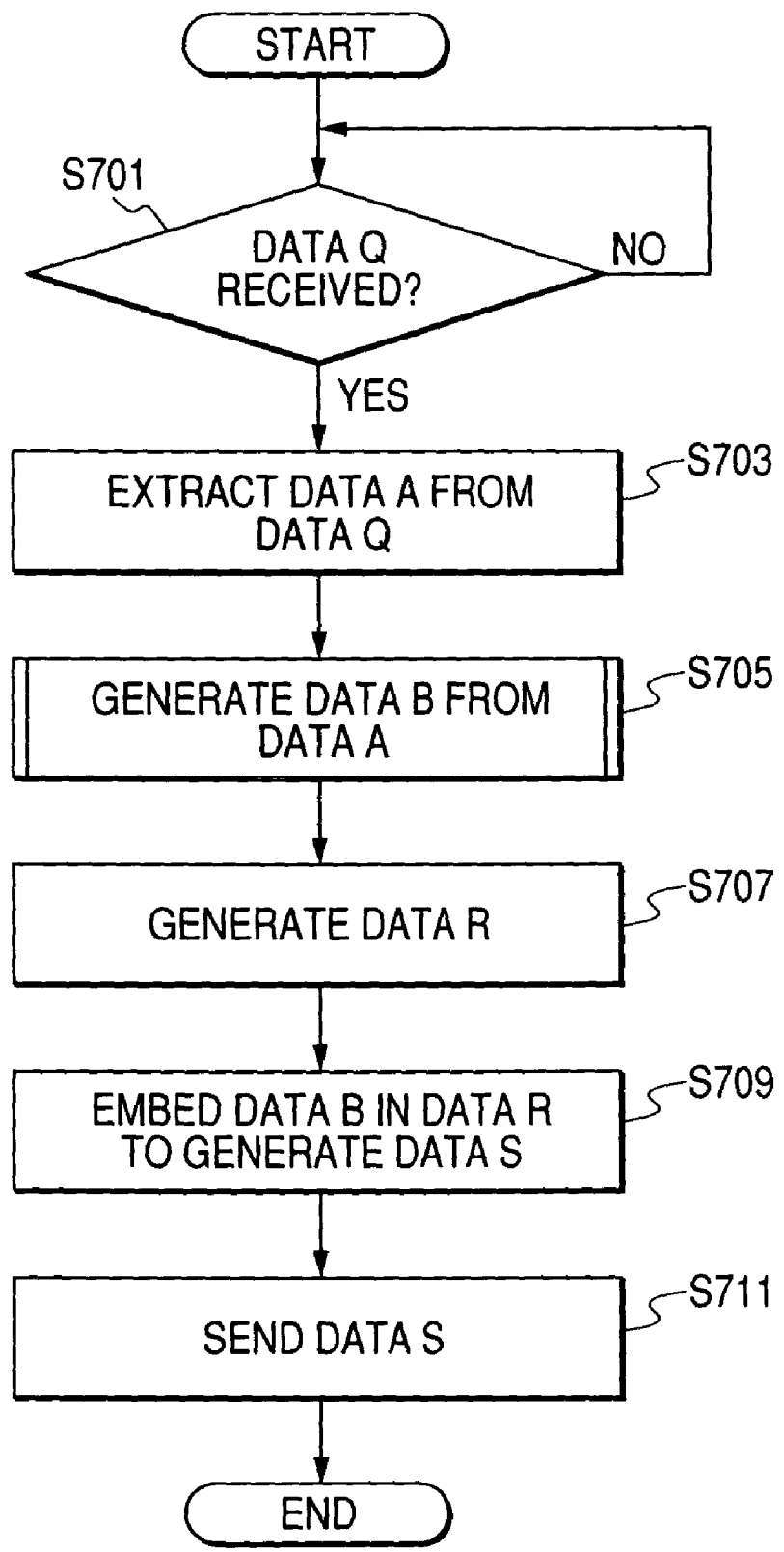
FIG. 16 is a flowchart of a segment of a control program for a computer system in a battery in FIG. 13.

FIG. 16 is a flowchart of a segment of the control program for the computer system in the battery 200. As shown in FIG. 16, a first step S701 of the program segment decides whether or not the 4-byte authentication data Q from the video camera 100 is received by the interface 200A. When it is decided that the authentication data Q is received, the program advances from the step S701 to a step S703. Otherwise, the step S701 is repeated.

The step S703 retrieves the first embedding pattern from the ROM 200C. The step S703 extracts the 2-byte verification data A from the received authentication data Q according to the retrieved first embedding pattern.

A block S705 following the step S703 generates the 2-byte verification reply data B from the extracted 2-byte verification data A.

A step S707 subsequent to the block S705 produces 4-byte random data, and uses the produced random data as the 4-byte reply base data R.

A step S709 following the step S707 retrieves the second embedding pattern from the ROM 200C. The step S709 embeds the verification reply data B in the reply base data R according to the retrieved second embedding pattern, and thereby generates the 4-byte authentication reply data S.

A step S711 subsequent to the step S709 controls the interface 200A to send the authentication reply data S to the video camera 100. After the step S711, the execution of the program segment ends.

Figure 17:
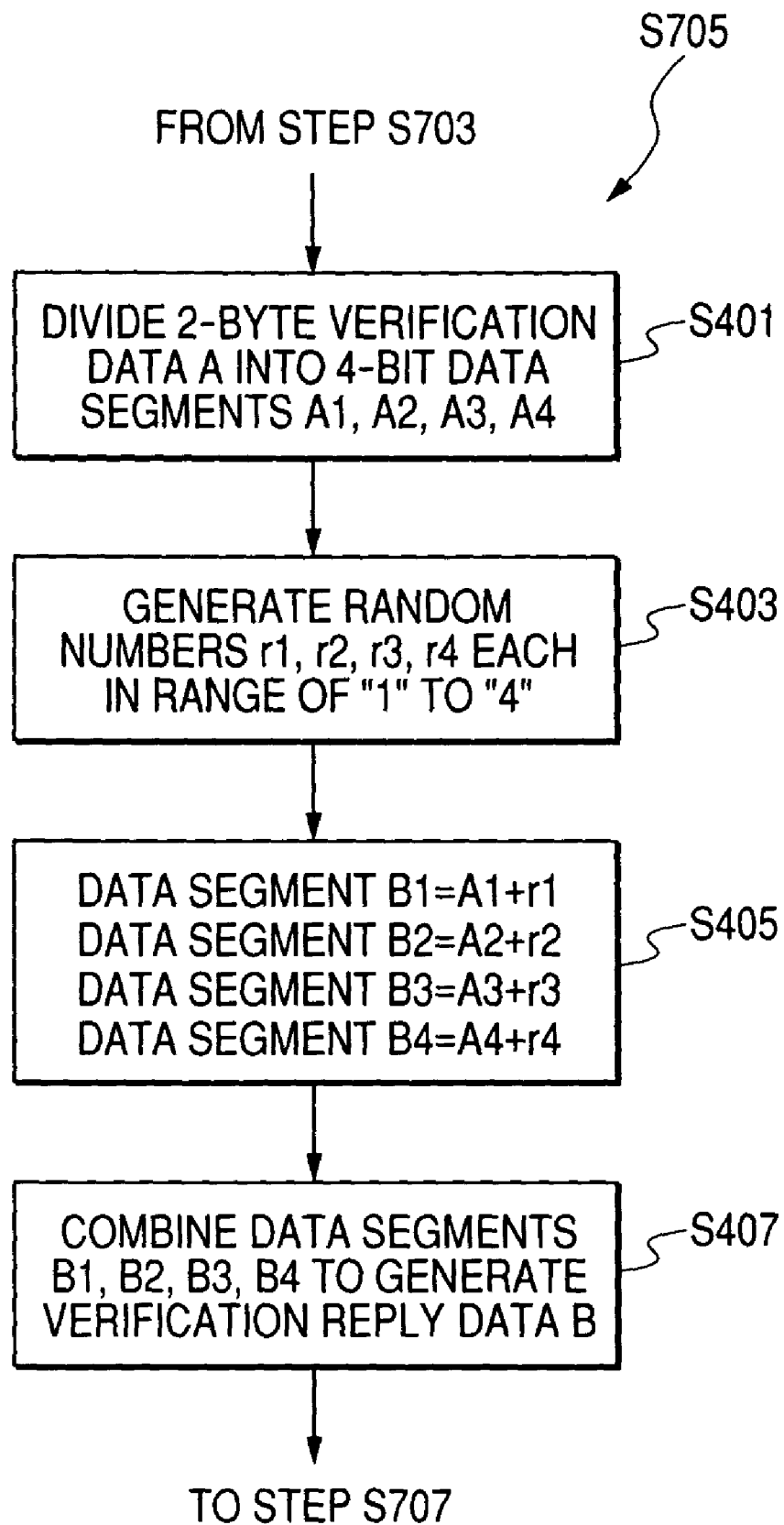
FIG. 17 is a flowchart of the details of a block in FIG. 16.

FIG. 17 shows the details of the block S705 in FIG. 16. As shown in FIG. 17, the block S705 includes a step S401 which follows the step S703 (see FIG. 16). The step S401 divides the 2-byte verification data A into the 4-bit data segments A1, A2, A3, and A4.

A step S403 subsequent to the step S401 produces the random numbers r1, r2, r3, and r4 each in the range of "1" to "4" in decimal notation, that is, in the range of "001" to "100" in binary notation.

A step S405 following the step S403 adds the data segment A1 and the random number r1 to get the data segment B1. The step S405 adds the data segment A2 and the random number r2 to get the data segment B2. The step S405 adds the data segment A3 and the random number r3 to get the data segment B3. The step S405 adds the data segment A4 and the random number r4 to get the data segment B4.

A step S407 subsequent to the step S405 combines the data segments B1, B2, B3, and B4 to generate the 2-byte verification reply data B. After the step S407, the program advances to the step S707 (see FIG. 16).

Third Embodiment

A third embodiment of this invention is similar to the first or second embodiment thereof except for design changes mentioned hereafter.

In the third embodiment of this invention, the verification data generator 102 produces the verification data A on a plural-bit by plural-bit basis, for example, a 5-bit by 5-bit basis or a 15-bit by 15-bit basis. The verification reply data generator 203 produces the verification reply data B on a plural-bit by plural-bit basis, for example, a 5-bit by 5-bit basis or a 15-bit by 15-bit basis. The authentication data generator 103 produces the authentication data Q on a plural-bit by plural-bit basis, for example, a 5-bit by 5-bit basis or a 15-bit by 15-bit basis. The authentication reply data generator 205 produces the authentication reply data S on a plural-bit by plural-bit basis, for example, a 5-bit by 5-bit basis or a 15-bit by 15-bit basis.

The authentication data transmitter 105 sends the authentication data Q on a plural-bit by plural-bit basis, for example, a 5-bit by 5-bit basis or a 15-bit by 15-bit basis. The authentication data receiver 201 accepts the authentication data Q on a plural-bit by plural-bit basis, for example, a 5-bit by 5-bit basis or a 15-bit by 15-bit basis. The authentication reply data transmitter 206 sends the authentication reply data S on a plural-bit by plural-bit basis, for example, a 5-bit by 5-bit basis or a 15-bit by 15-bit basis. The authentication reply data receiver 106 accepts the authentication reply data S on a plural-bit by plural-bit basis, for example, a 5-bit by 5-bit basis or a 15-bit by 15-bit basis.

Fourth Embodiment

A fourth embodiment of this invention is similar to the first or second embodiment thereof except for a design change mentioned hereafter.

In the fourth embodiment of this invention, the video camera 100 sends the verification data A to the battery 200 without embedding the verification data A in the authentication base data P.

Fifth Embodiment

A fifth embodiment of this invention is similar to the first or second embodiment thereof except for design changes mentioned hereafter.

In the fifth embodiment of this invention, the verification reply data generator 203 converts the verification data A into the verification reply data B according to a prescribed calculation procedure including one or ones of (1) subtracting numerical values in a prescribed range from the segments of the verification data A, (2) multiplying the segments of the verification data A by numerical values in a prescribed range, and (3) dividing the segments of the verification data A by numerical values in a prescribed range.

The comparing checker 108 is designed to operate in harmony with the operation of the verification reply data generator 203.

Sixth Embodiment

A sixth embodiment of this invention is similar to the first or second embodiment thereof except for design changes mentioned hereafter.

In the sixth embodiment of this invention, the verification reply data generator 203 divides the verification data A into a given number of segments which differs from 4. The given number is equal to, for example, 8. Then, the verification reply data generator 203 adds random numbers in a prescribed range to the segments respectively. Subsequently, the verification reply data generator 203 combines the addition results to generate the verification reply data B.

The comparing checker 108 is designed to operate in harmony with the operation of the verification reply data generator 203.

Seventh Embodiment

A seventh embodiment of this invention is similar to the first or second embodiment thereof except for design changes mentioned hereafter.

In the seventh embodiment of this invention, the verification reply data generator 203 unequally divides the verification data A into a given number of segments which differs from 4. The given number is equal to, for example, 3 or 5. The ratio between the bit widths of the segments is, for example, "2:1" or "4:1". Then, the verification reply data generator 203 adds random numbers in a prescribed range to the segments respectively. Subsequently, the verification reply data generator 203 combines the addition results to generate the verification reply data B.

The comparing checker 108 is designed to operate in harmony with the operation of the verification reply data generator 203.

Eighth Embodiment

An eighth embodiment of this invention is similar to the first or second embodiment thereof except for design changes mentioned hereafter.

In the eighth embodiment of this invention, the verification reply data generator 203 equally or unequally divides the verification data A into a variable number of segments with a variable ratio between the bit widths of the segments. Then, the verification reply data generator 203 adds random numbers in a prescribed range to the segments respectively. Subsequently, the verification reply data generator 203 combines the addition results to generate the verification reply data B.

The comparing checker 108 is designed to operate in harmony with the operation of the verification reply data generator 203.

Preferably, the number of the segments and the ratio between the bit widths of the segments are adaptively varied depending on the authentication data Q and the verification data A sent to the battery 200.

According to an example, the number of the segments and the ratio between the bit widths of the segments are adaptively varied depending on whether a bit sequence of the authentication data Q or the verification data A corresponds to an odd number or an even number, or whether a specified-position bit in the authentication data Q or the verification data A is "1" or "0".

What is claimed is:

1. An authenticating device for authenticating a device to be authenticated, comprising:
   means for generating authentication base data having N bytes, where N denotes a predetermined natural number;
   means for generating verification data having M bytes, where M denotes a predetermined natural number smaller than the predetermined natural number N;
   means for embedding the generated verification data in the generated authentication base data according to a first prescribed embedding pattern to generate authentication data;
   means for sending the generated authentication data toward the device to be authenticated;
   means for receiving authentication reply data from the device to be authenticated, the authentication reply data having L bytes, where L denotes a predetermined natural number greater than the predetermined natural number M;
   means for extracting verification reply data from the received authentication reply data according to a second prescribed embedding pattern, the extracted verification reply data having M bytes;
   means for dividing the extracted verification data into first data segments;
   means for dividing the verification data into second data segments which correspond to the first data segments respectively;
   means for adding different values to each of the second data segments to obtain different addition results for each of the second data segments;
   means for deciding whether or not one of the obtained different addition results for each of the second data segments is equal to corresponding one of the first data segments;
   means for concluding that the device to be authenticated is genuine in cases where one of the obtained different addition results for each of the second data segments is equal to corresponding one of the first data segments; and
   means for concluding that the device to be authenticated is not genuine in cases where none of the obtained different addition results for at least one of the second data segments are equal to corresponding one of the first data segments.

2. The authenticating device as recited in claim 1, wherein the first and second prescribed embedding patterns are equal to each other.

3. The authenticating device as recited in claim 1, wherein the first and second prescribed embedding patterns are different from each other.

4. A device to be authenticated by an authenticating device, comprising:
   means for receiving authentication data from the authenticating device, the received authentication data having N bytes, where N denotes a predetermined natural number;
   means for extracting verification data from the received authentication data according to a first prescribed embedding pattern, the extracted verification data having M bytes, where M denotes a predetermined natural number smaller than the predetermined natural number N;
   means for dividing the extracted verification data into first data segments;
   means for generating random numbers each in a prescribed range;
   means for adding the generated random numbers to the first data segments to generate second data segments respectively;
   means for combining the generated second data segments to generate verification reply data;
   means for generating reply base data having L bytes, where L denotes a predetermined natural number greater than the predetermined natural number M;
   means for embedding the generated verification reply data in the generated reply base data according to a second prescribed embedding pattern to generate authentication reply data; and means for sending the generated authentication reply data toward the authenticating device.

5. A device authentication system including an authenticating device and a device to be authenticated, wherein the authenticating device comprises:

means for generating authentication base data having N bytes, where N denotes a predetermined natural number;

means for generating verification data having M bytes, where M denotes a predetermined natural number smaller than the predetermined natural number N;

means for embedding the generated verification data in the generated authentication base data according to a first prescribed embedding pattern to generate authentication data;

means for sending the generated authentication data toward the device to be authenticated;

means for receiving authentication reply data from the device to be authenticated, the authentication reply data having L bytes, where L denotes a predetermined natural number greater than the predetermined natural number M;

means for extracting verification reply data from the received authentication reply data according to a second prescribed embedding pattern, the extracted verification reply data having M bytes;

means for dividing the extracted verification data into first data segments;

means for dividing the verification data into second data segments which correspond to the first data segments respectively;

means for adding different values to each of the second data segments to obtain different addition results for each of the second data segments;

means for deciding whether or not one of the obtained different addition results for each of the second data segments is equal to corresponding one of the first data segments;

means for concluding that the device to be authenticated is genuine in cases where one of the obtained different addition results for each of the second data segments is equal to corresponding one of the first data segments; and means for concluding that the device to be authenticated is not genuine in cases where none of the obtained different addition results for at least one of the second data segments are equal to corresponding one of the first data segments;

wherein the device to be authenticated comprises:

means for receiving the authentication data from the authenticating device;

means for extracting the verification data from the received authentication data according to the first prescribed embedding pattern;

means for dividing the extracted verification data into third data segments;

means for generating random numbers each in a prescribed range;

means for adding the generated random numbers to the third data segments to generate fourth data segments respectively;

means for combining the generated fourth data segments to generate the verification reply data;

means for generating reply base data having L bytes;

means for embedding the generated verification reply data in the generated reply base data according to the second prescribed embedding pattern to generate the authentication reply data; and means for sending the generated authentication reply data toward the authenticating device.

* * * * *